United States Patent
Scoggins et al.

(10) Patent No.: US 6,373,847 B1
(45) Date of Patent: Apr. 16, 2002

(54) COMPUTER TELEPHONY INTEGRATION SERVER WITH DIAL-UP NETWORK ACCESS

(75) Inventors: Shwu-Yan Chang Scoggins, Cary; Mark Joseph Golaszewski, Raleigh, both of NC (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/018,146

(22) Filed: Feb. 3, 1998

(51) Int. Cl.[7] ............................................. H04M 7/00
(52) U.S. Cl. ...................... 370/401; 370/463; 379/207; 379/219; 709/219
(58) Field of Search ............................ 370/351, 352, 370/354, 355, 356, 357, 386, 401, 463; 379/309, 207, 219; 709/219, 218, 217, 237

(56) References Cited

U.S. PATENT DOCUMENTS

| | | | | | |
|---|---|---|---|---|---|
| 5,598,536 A | * | 1/1997 | Slaughter, III et al. | ..... | 370/401 |
| 5,610,910 A | * | 3/1997 | Focsaneanu et al. | ........ | 370/401 |
| 5,802,163 A | * | 9/1998 | Miloslvsky | ................. | 379/210 |
| 5,805,587 A | * | 9/1998 | Norris et al. | ................ | 370/352 |
| 6,078,581 A | * | 6/2000 | Shtivelman et al. | ........ | 370/352 |
| 6,081,589 A | * | 6/2000 | Jiang et al. | .................. | 379/221 |
| 6,145,002 A | * | 11/2000 | Srinivasan | ................... | 709/225 |
| 6,188,688 B1 | * | 2/2001 | Buskirk, Jr. | ................ | 370/352 |

* cited by examiner

*Primary Examiner*—Wellington Chin
*Assistant Examiner*—Frank Duong
(74) *Attorney, Agent, or Firm*—Withrow & Terranova, P.L.L.C.

(57) ABSTRACT

Computer telephone integration (CTI) server having dial-up network access. By providing increased integration between a CTI server and the public switched telephone network (PSTN), enhanced features can be provided to users of the CTI server for accessing on-line services. The server connects with on-line service providers either through a PSTN office or a dedicated data network which is associated with the PSTN. The dedicated data network is usually either a frame relay or an asynchronous transfer mode (ATM) network. The CTI server can also be connected to customer premises equipment (CPE) through a PSTN office to provide CTI services to dial-up users. Additionally, the CTI server can provide simultaneous access to multiple service providers which allows better integration of CTI services and services provided by Internet service providers.

18 Claims, 15 Drawing Sheets

COMPUTER TELEPHONY INTEGRATION SERVER WITH DIAL-UP NETWORK ACCESS

BACKGROUND

1. Field of the Invention

This invention relates to computer telephony integration (CTI). More particularly, this invention relates to the way on-line services and the Internet are accessed through CTI servers. The invention includes improvements to a CTI server which allow dial-up access to such a server, and which also can be used to provide connections to multiple Internet service providers or other on-line access services through the CTI server.

2. Description of the Problem Solved

With the increased use of on-line services, and especially the Internet, the need for more efficient ways to provide access to these services has become pressing. Currently, most users who access these services from small office and home office environments connect through the public switched telephone network (PSTN). FIG. 1 shows an example of such a connection. An originating PSTN office 101 contains a switch which can connect to a service provider point-of-presence (POP) 106 through the PSTN 102 via a terminating PSTN office 103. In some situations, a tandem office within the PSTN intervenes. Alternatively, for a more efficient connection, the originating office can off-load data calls for an access provider to a dedicated data network 104. For illustration purposes, router 105 is shown as an entry point to the dedicated data network. This dedicated data network can be packet-switched, frame relay, or asynchronous transfer mode (ATM). In any case this data network is usually a connectionless or packet switched type of network as opposed to a circuit switched network like the PSTN. This off-loading can be used to alleviate switch congestion in the PSTN. Multiple methods and systems are known which can be used to accomplish this data off-loading. Examples include the Internet Thruway™ products marketed by the assignee of the present application, as well as the methods and apparatus described in pending U.S. patent applications Ser. Nos. 980,534 and 982,155, filed Dec. 1, 1997, which are assigned to the assignee of the present invention. The aforementioned patent applications are incorporated herein by reference.

Users of on-line services and the Internet who have access to a local area network (LAN) often connect to a service provider POP via a computer telephony integration (CTI) server. FIG. 2 illustrates this type of connection. The CTI server 201 is connected to the users at the customer premises equipment (CPE) via LAN 205. The CTI server 201 provides a single direct data connection 202 to one service provider POP 203. A CTI messaging connection 204 is provided to a public switched telephone network; however, calls cannot be connected through this messaging connection. The messaging connection is made through a data link adapter in the CTI server. The function and operation of the CTI server is discussed in various well-known specifications. Some examples of these specifications include: "Net-Ware® TSAPI (Telephony Application Programming Interface)" published by Novell; "TSPI (Telephony Server Programming Interface)" published by Microsoft; "SCSAS (Signaling Computing Services Architecture)" published by Dialogic; and the "S.100" series of standards published by the Enterprise Computer Telephony Forum (ECTF), all of which are incorporated herein by reference. The CTI server provides users with specialized multimedia, centrex and billing services. The CTI server connection, however, lacks some capabilities of the PSTN connection because it does not have access to the large multipoint, multipath switched network. It is not accessible to dial-up users. Additionally, only one on-line service provider, or Internet service provider is accessible to users. Since different service providers may provide different services at different rates and/or times, users may wish to access multiple service providers simultaneously. For example, a user may wish to use one service provider for e-mail, and another for fax or video conferencing.

What is needed is a way to more closely integrate the operation of the CTI server with that of the PSTN for providing on-line access, as well as dial-up access to the CTI server. Such integration would have advantages resulting from providing more function to both dial-up users of the PSTN and LAN users of the CTI server, including access to multiple, simultaneous connections to on-line service providers, especially Internet service providers.

SUMMARY

The present invention meets the above described need by providing a computer telephony integration (CTI) server that can make connections to one or more service provider's points-of-presence in various ways using the public switched telephone network (PSTN) or a dedicated digital network associated with the PSTN. In one embodiment the CTI server is connected to a first PSTN office having a customer premises equipment (CPE) connection, and a second PSTN office which is connected to at least one point-of-presence (POP). The CTI server manages one or more CPE to service provider connections so that on-line access is provided through the PSTN. In this case, the CPE uses the CTI server directory number (DN) as the DN for establishing the service provider connection. When the CTI server receives a call from a user, the CTI server establishes a CTI connection between itself and the CPE. It receives a request for on-line access to the service provider and connects via the PSTN. Because the CTI server can access multiple service providers using the resources of the PSTN, a user can establish multiple simultaneous connections to on-line service providers.

In another embodiment, the process is similar to that described above but a connection is set up through the PSTN for a user connected to the CTI server via a local area network (LAN) connection. This allows the LAN user to make use of the enhanced service provider access possible by connecting to service providers through a PSTN. This enhanced service provider access includes simultaneous access to multiple service providers.

It is also possible to connect the CTI server to the service providers through a dedicated data network which is associated with the PSTN. In this case the CTI server is connected to CPE through either a PSTN office or a LAN. The CTI server receives a request from a user to establish a connection to a service provider. The CTI server supplies a network address for the particular service provider. Again a CTI connection is established between the CPE and the CTI server. A CPE to service provider connection is then established through the dedicated data network which is associated with the public switched telephone network. The CTI server uses the network address of the service provider POP to connect to the service provider. A user can request additional connections to an additional service providers, thus providing multiple, simultaneous sessions to a user. Two or more of the various connections shown in the various embodiments of the CTI server of the present invention can be implemented simultaneously.

In any of the cases described above, a user can also request to drop one or more specific CPE to service provider connections when the user is finished using these connections. The CPE can also request that the CTI server drop the CTI server connection all together. This severs all connections to service providers and terminates the communications with the CTI server.

In the preferred embodiments, the new functions are implemented by computer program code. The computer program code is used in combination with appropriate computer hardware. A CTI server includes adapters for connection to the PSTN, the dedicated data network and possibly also a local area network. These adapters are connected at least one bus. The CTI server includes a microprocessor and storage with appropriate computer program code. These last elements together form a processing core which is the means for controlling the operation of the CTI server, thus providing management of CPE to service provider connections through the CTI server. On-line access is provided through the PSTN by dialing the directory number of the CTI server. On-line access is also provided to users of the local area network. Connections to service providers are made through the PSTN, or a dedicated data network associated with the PSTN, or both. The appropriate computer program code is supplied on a storage media, which can be diskette, CD-ROM, magnetic tape, or some other form of memory device, or the computer program code can be received via the Internet or some other type of network. The CTI server is often implemented by a workstation or some type of personal computer.

The CTI server as described provides enhanced function to users. It allows users to access multiple on-line service providers simultaneously. It also allows users in a small office/home office (SOHO) environment who have only dial-up facilities to access a CTI server. Previously, CTI server access was limited to users on a private local area network, and those users had to use a single on-line service provider.

DETAILED DESCRIPTION OF THE PREFERRED EMBODIMENTS

Figure 1:
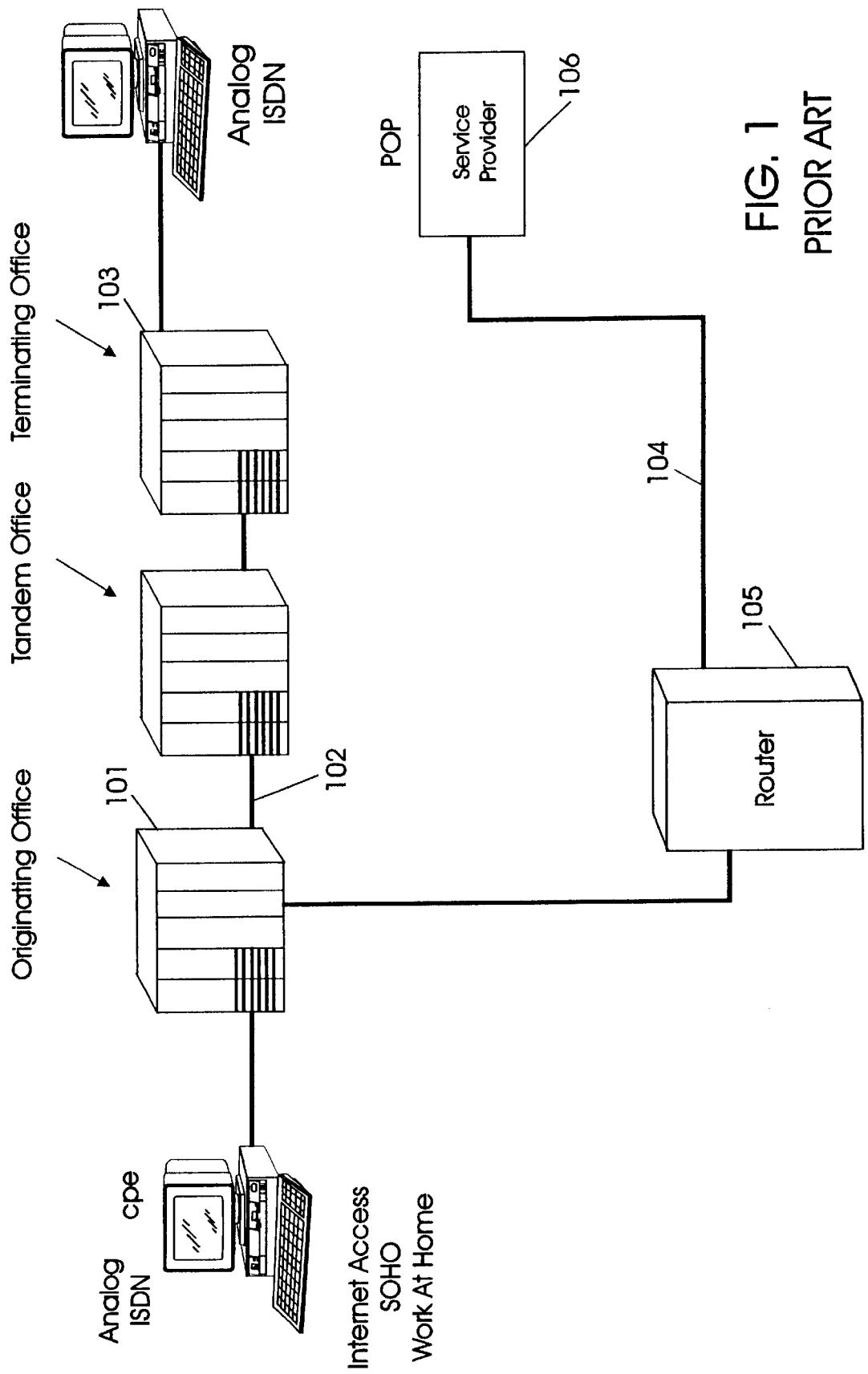
FIG. 1 is a network diagram showing the user customer premises equipment (CPE) connection to the service provider through the public switched telephone network (PSTN) of the prior art.
Figure 2:
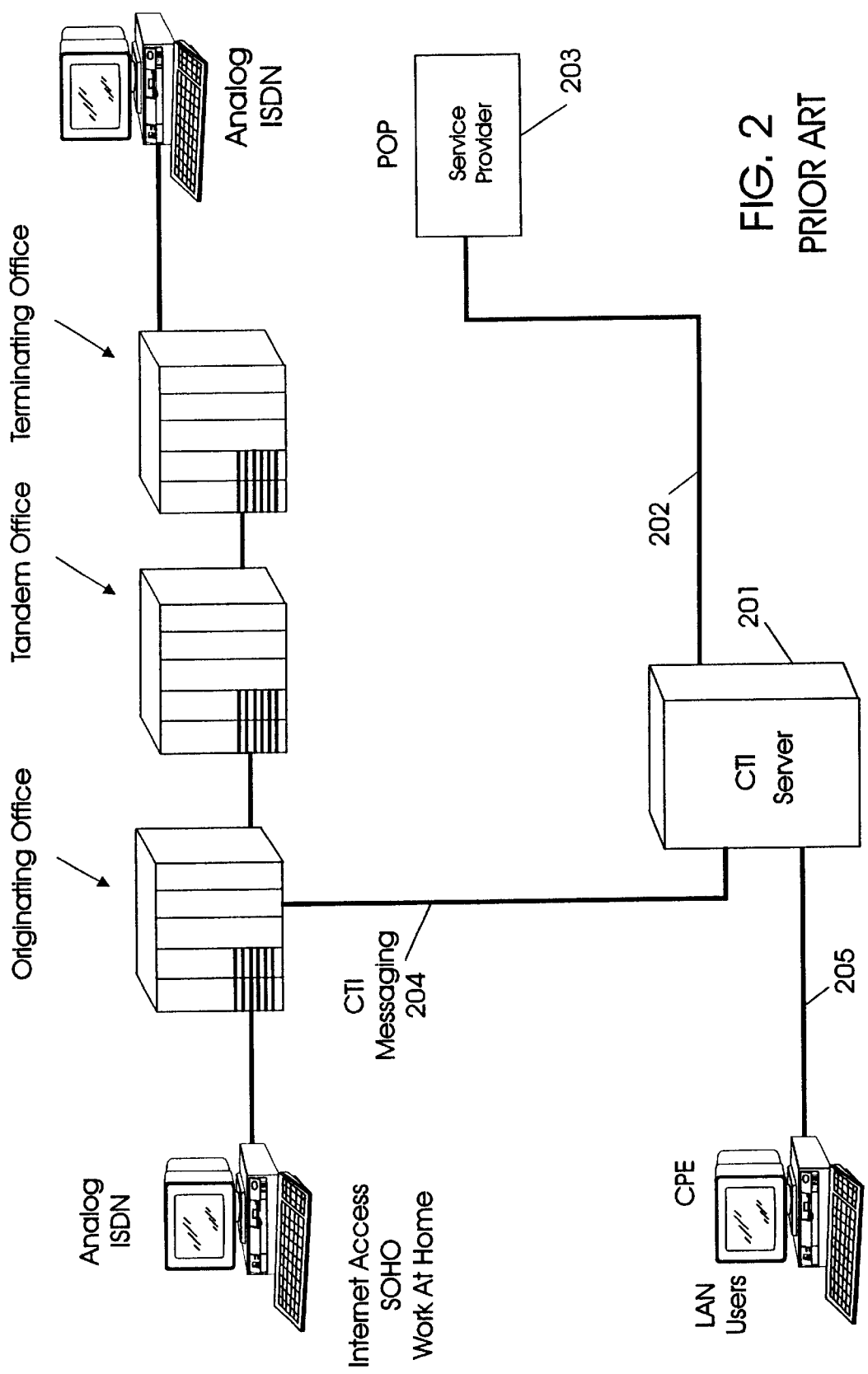
FIG. 2 is a network diagram showing a computer telephony integration (CTI) server which has a local area network (LAN) connection to the CPE and a direct data connection to a single service provider as in the prior art.
Figure 3:
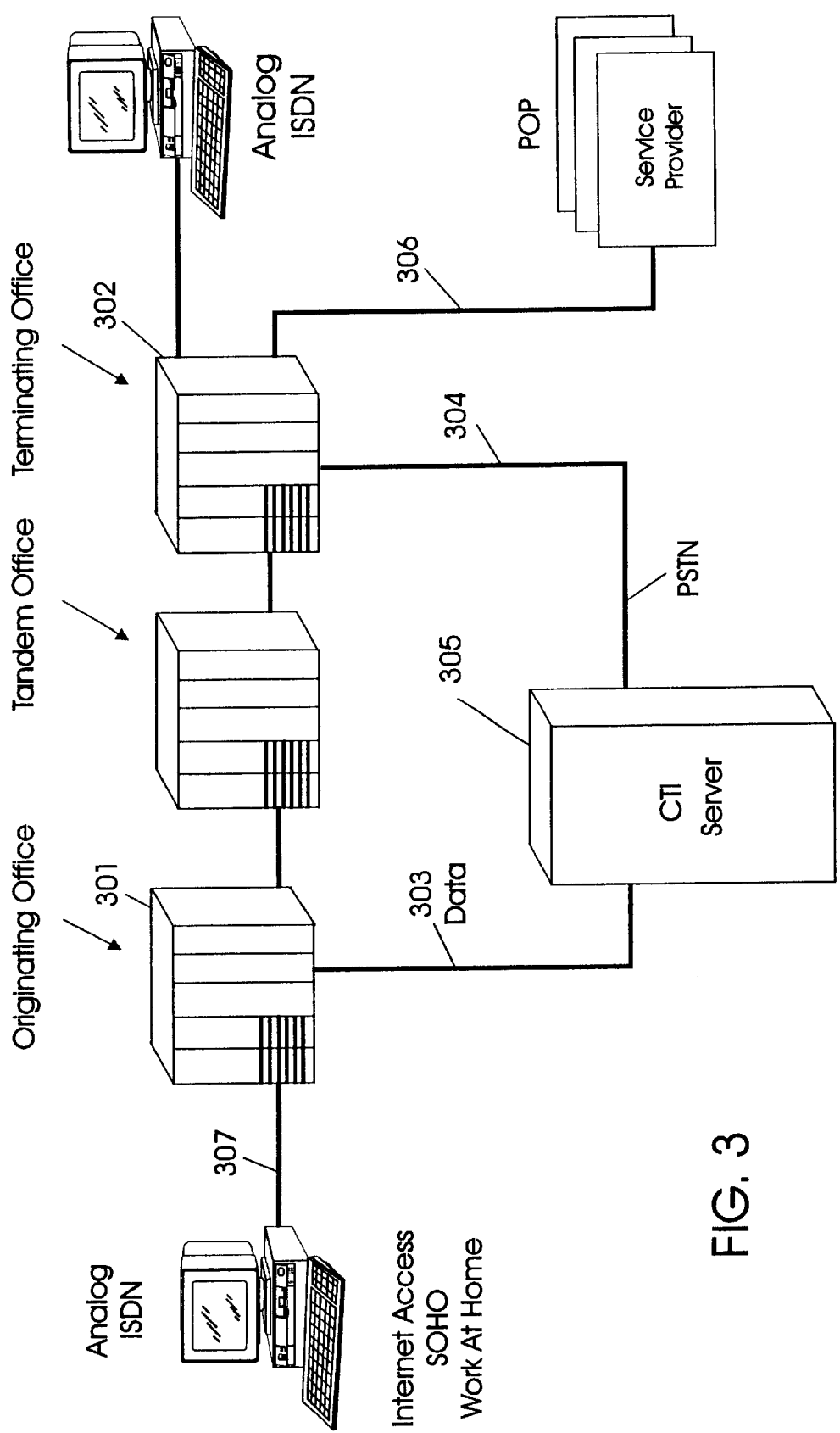
FIG. 3 is a network diagram showing a CTI server which allows dial-up access by users and is connected to a service provider through the PSTN according to one embodiment of the present invention.

FIG. 3 shows how a computer telephony integration (CTI) server of the present invention is connected to the public switched telephone network (PSTN) according to one embodiment. The customer premises equipment (CPE) is connected to an originating office 301 through a CPE connection 307. The CPE connection can be an analog phone line connection, a cellular phone or other wireless connection, or an integrated services digital network (ISDN) basic rate interface (BRI) connection. The PSTN can be an analog or digital network. The CTI server 305 is connected to a PSTN office 301 via a network connection 303. Preferably, this connection is a TCP/IP connection. The CTI server 305 is in most cases connected to another PSTN office 302 via a regular PSTN connection 304. In an analog PSTN environment this connection 304 is a T1 connection or a subrate of T1. With ISDN, this connection is via a primary rate interface (PRI) or a subrate of PRI. The PSTN office 302 is then connected to one or more service provider's point-of-presence (POP) via a PSTN connection 306, which again is either a T1 connection or a PRI connection as explained above.

As stated above, the CTI server in this embodiment is usually connected to a second PSTN office in order to finally connect to the service provider POP. However, if the service provider POP is located geographically very close to the CTI server, it is possible for both the CPE connection and the service provider connection to be made through the same PSTN office. In this case, PSTN offices 301 and 302 are in fact the same PSTN office. In any case, the CTI server is using PSTN resources both to connect to the CPE and to connect to the service provider POP.

The network of FIG. 3 operates as follows. When users dial up the originating office 301, a switch in the originating office recognizes the CTI server directory number (DN), performs a translation, and connects to the CTI server via the TCP/IP connection 303. The CTI server than establishes a CTI connection with the CPE, in most cases requiring some sort of log in to verify who a user is for billing and access control purposes. If a user requests a connection to a service provider, usually an Internet service provider (ISP), the CTI server makes the connection through a switch in the terminating office 302. Since the switch in the terminating office is part of a PSTN with multiple connection paths, it can provide the CTI server 305 and hence users with multiple service provider connections. A service provider is most often an ISP, but it can also be a service provider of a commercial on-line service such as LEXIS® or DIALOG®.

Figure 4:
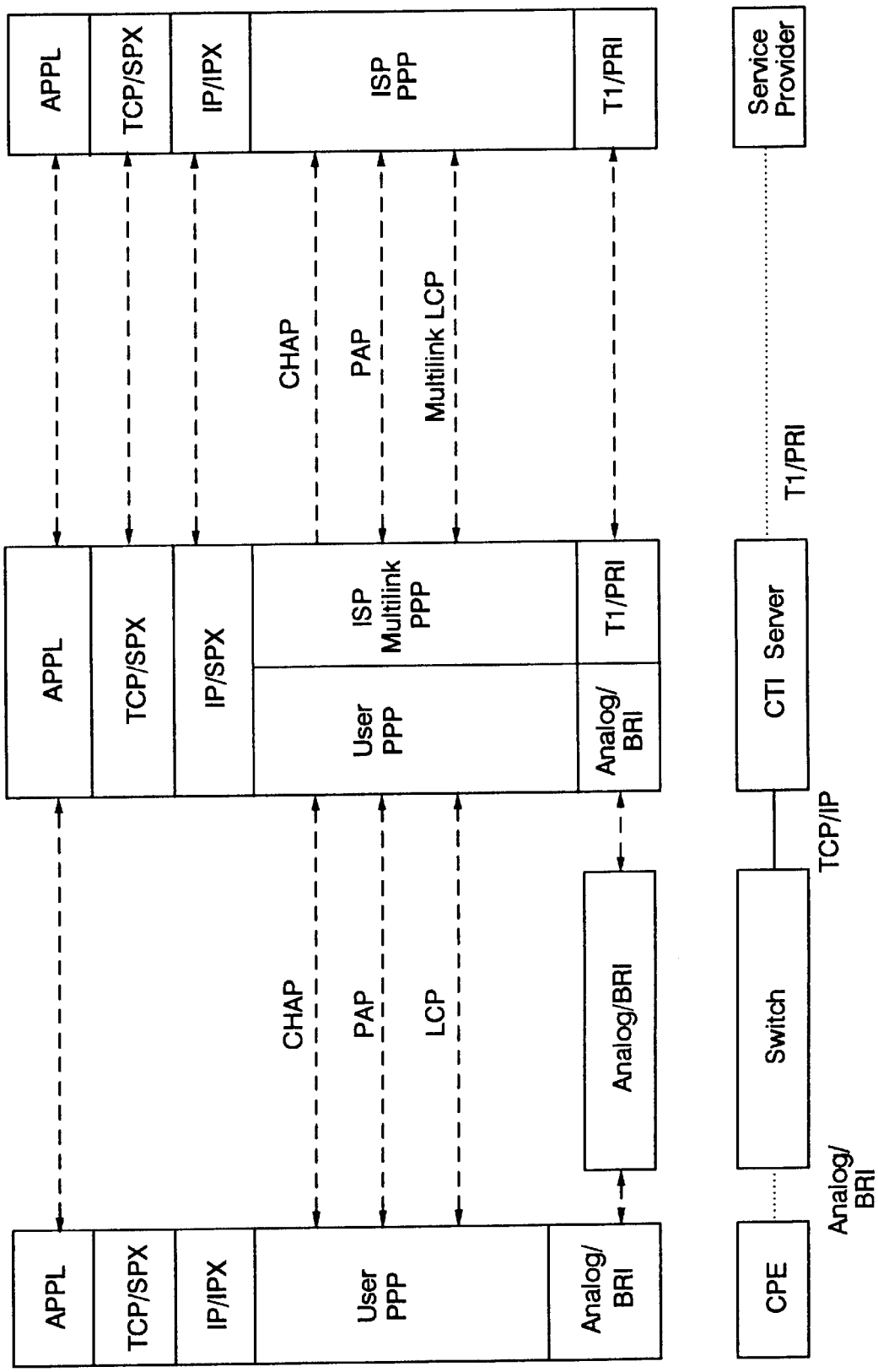
FIG. 4 shows the protocol stacks of the CTI server and how they relate to other protocol stacks in the network according to the embodiment of the present invention which is illustrated in FIG. 3.

FIG. 4 illustrates the protocol stacks used in the network in which the CTI server according to the present invention is employed. APPL in FIG. 4 refers to an application. When the originating user issues a command from an application, the application passes the command down to the transport layer which in this example is either TCP or SPX. TCP is the transmission control protocol. SPX refers to sequence packet exchange, which provides connection oriented, reliable sequence transport delivery and flow control. Both are part of well-known transport and network layer standards. The transport layer is layer 4 and the network layer is layer 3 of the open systems interconnect model. The transport layer is responsible for the end-to-end connection. The transport layer may or may not use the IP layer, for its service request. The IP layer can either be IP or IPX. IP stands for Internet protocol and IPX indicates Internet packet exchange which provides connectionless datagram delivery services. Again, both IP an IPX are part of the well-known transport and network layer standards. The user transport and IP layers will establish a PPP (point-to-point protocol) connection with the remote CTI server. The PPP connection request is passed through the analog or BRI lines to switch(es) and then to the CTI server. PPP is commonly used for interoperating over point to point links. It provides asynchronous to synchronous conversion and allows address assignment. PPP is defined in the well known standard RFC1661 maintained by the Internet Engineering Task Force (IETF).

The CTI server hardware receives the call connection requests. It sends notification messages to the applications. An application accepts the connection requests and sends a transport layer connection response and a PPP connection response to the originating user. The link control protocol, LCP, is part of the PPP connection setup. It defines the PPP state machine for all PPP connections and is defined in standard RFC1570 maintained by the Internet Engineering Task Force.

In order for the PPP connection to be completed, the originating user and the CTI server have to exchange security information which can be done through password authentication protocol (PAP) and challenge handshake authentication protocol (CHAP). Once the security is cleared and the connection is setup, the CTI server application can perform CTI services upon the user application's request and pass unsolicited network notifications to the user application.

If the user wants to be connected to a service provider while maintaining the connection to the CTI server, the CTI server will establish the connection. The CTI server application will issue a command containing the service provider's address to the transport layer. The transport and network layers will establish a multi-link PPP (multilink) connection with the remote service provider. If a large volume of traffic is expected, a T1 or PRI connection between a CTI server and the service provider may be needed. Otherwise, a subrate of T1 or PRI may be sufficient. In most of cases, multiple T1/PRI connections are expected. Multilink PPP combines links into one virtual PPP link. It is the subject of the well-known standard RFC1990 maintained by the IETF.

The T1/PRI connection is passed through switch(es) to the service provider. The service provider hardware receives the connection requests and generates a notification to the service provider application. The service provider application accepts the connection requests and sends a transport layer connection response and a PPP connection response to the originating user. Multilink and LCP are part of the PPP connection. PAP and CHAP security information exchange is usually also needed as part of connection establishment. The PAP and CHAP authentication can be either done at the CTI server, or the PAP and CHAP authentication can be done at the originating user application. The authentication information will be different in the two cases. If the security information is from the CTI server, then the originating user has more choice of which service provider to be connected to with a lower subscription fee.

Figure 5:
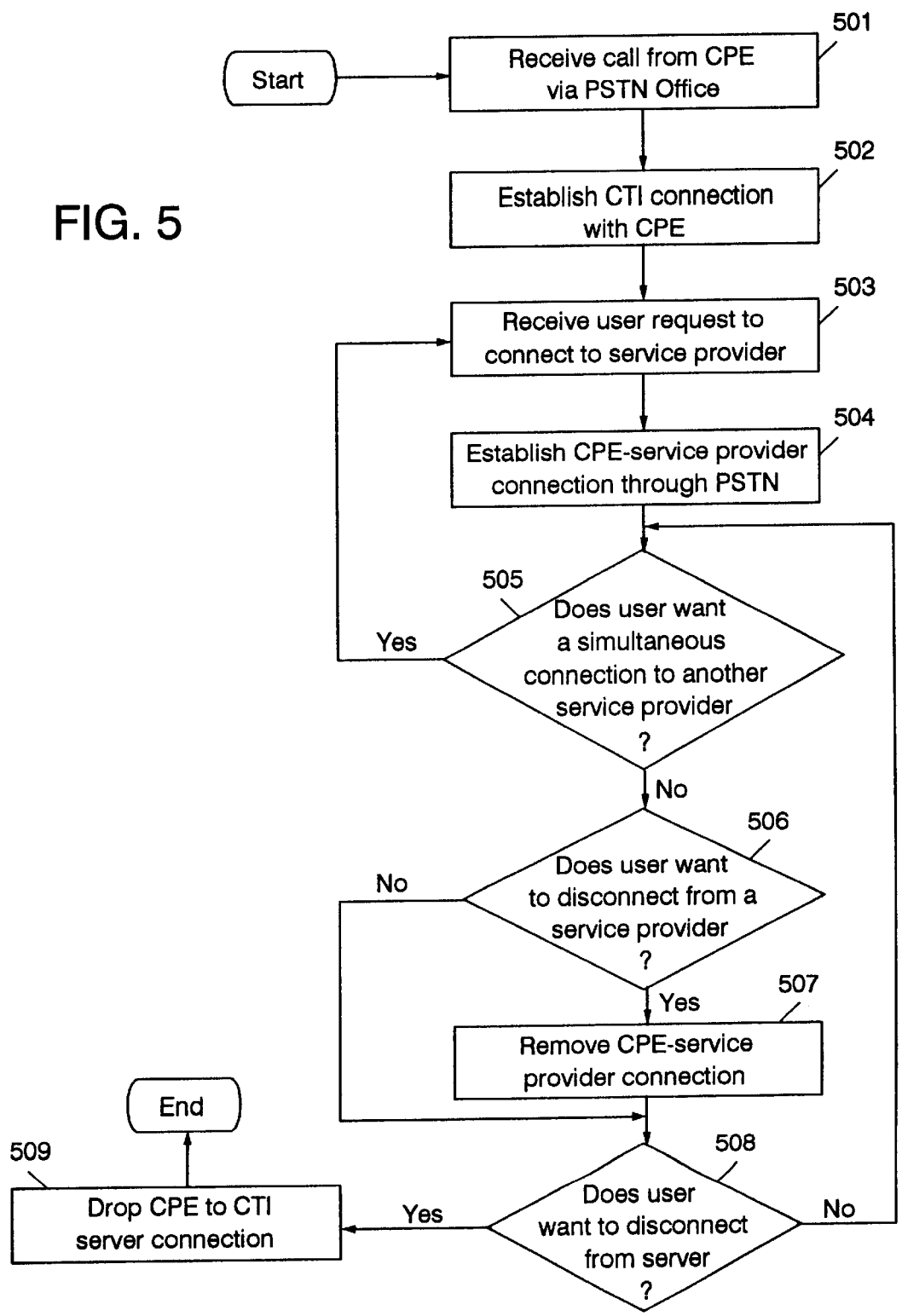
FIG. 5 shows a flow chart illustrating how a connection is made to service providers through the CTI server according to the embodiment of the present invention which is shown in FIG. 3.

FIG. 5 illustrates the high-level method used by the CTI server to manage connections in the network environment of FIG. 3. In step 501, the CTI server receives a call from CPE via a PSTN office. A user initiates such a call using a directory number (DN) for the CTI server as the terminating directory number. In this embodiment, the user is typically using a personal computer or workstation running the well-known point-to-point protocol (PPP). The connection may be made via an analog telephone line and a modem, via an ISDN basic rate interface (BRI), or via a wireless terminal. In step 502 the CTI server establishes a CTI connection with the CPE. This connection is established by the CTI server acting as a terminating point for the PPP connection to the user's PC. The CTI server then initiates handshaking with the CPE using a mechanism such as PAP and CHAP, as shown in FIG. 4.

At step 503, the CTI server receives a request from a user to connect to a service provider. The CTI server in this embodiment makes the connection using PSTN resources and the service provider's real DN. At step 504 a transparent connection between the CPE and the service provider POP is established as follows. The CTI server establishes a PPP connection with the service provider POP and establishes PAP and CHAP handshaking with the POP. The PPP connection is then terminated with the CPE, and a PPP connection is established transparently and directly between the CPE and the service provider POP. The user can request another, simultaneous service provider connection at 505, in which case the process repeats from step 503. The multiple connections are then managed using multilink PPP. After a connection is made, at 506, the server monitors to see if the user would like to drop a connection to a service provider at 506, and further, monitors to see if a user wishes to sever the CTI to CPE connection at 508. If the user wishes to drop a connection to an individual service provider, the server drops the connection at 507. Once the CTI server receives notification that the user wishes log out of the CTI server or drop the CTI server to CPE connection, the CTI server drops the connection at 509 and the process ends.

Figure 6:
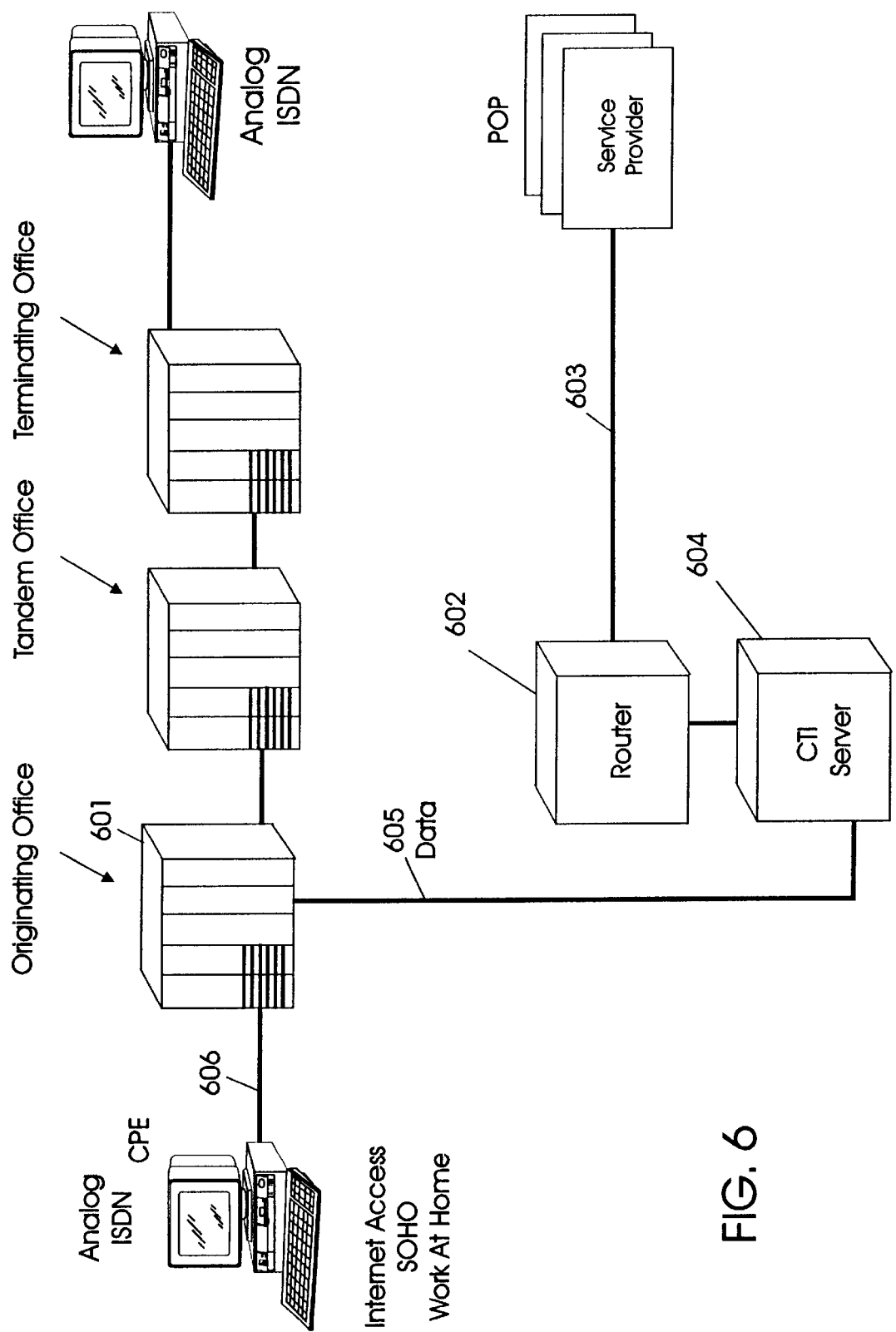
FIG. 6 is a network diagram showing a CTI server connected to allow dial-up access to users and which is also connected to allow connections to service providers using a dedicated data network which is associated with the PSTN according to another embodiment of the present invention.

FIG. 6 shows the network environment of the present invention in a different embodiment. In FIG. 6, the CPE is connected to a switch in the PSTN office 601 via a CPE connection 606 as before. The CTI server 604 is connected to the PSTN office 601 via a data connection 605. However, in this embodiment, the CTI server 604 is connected to a dedicated data network 603 which is associated with the public switched telephone network, and which provides for off-loading of data calls to save PSTN resources. Router 602 is an example of an entry point for this dedicated data network, however, the entry point can also be a packet switch or asynchronous transfer mode (ATM) switch. The dedicated data network is typically a packet or cell-switched network which forms part of the public network and uses some of the same media and facilities. Like the traditional circuit-switched public telephone network, the dedicated data network has many possible paths that can be used to access multiple service providers. The data connection 605 from the originating office to the CTI server can be a TCP/IP connection as before; however, in this embodiment, an Ethernet connection may be used also, since a originating office switch which is designed to interface with the dedicated data network will often have an Ethernet port for that purpose.

The network of FIG. 6 operates by users again dialing up the originating office switch using the CTI server DN through a CPE connection 606 which may be analog, ISDN or wireless. The switch performs a translation and forwards the connection request through the data port on the switch to the CTI server. The CTI server verifies the user and establishes a connection. If the user requests a connection to a service provider, the CTI server connects the call over the dedicated data network, using the network address for the service provider POP to establish the connection.

Figure 7:
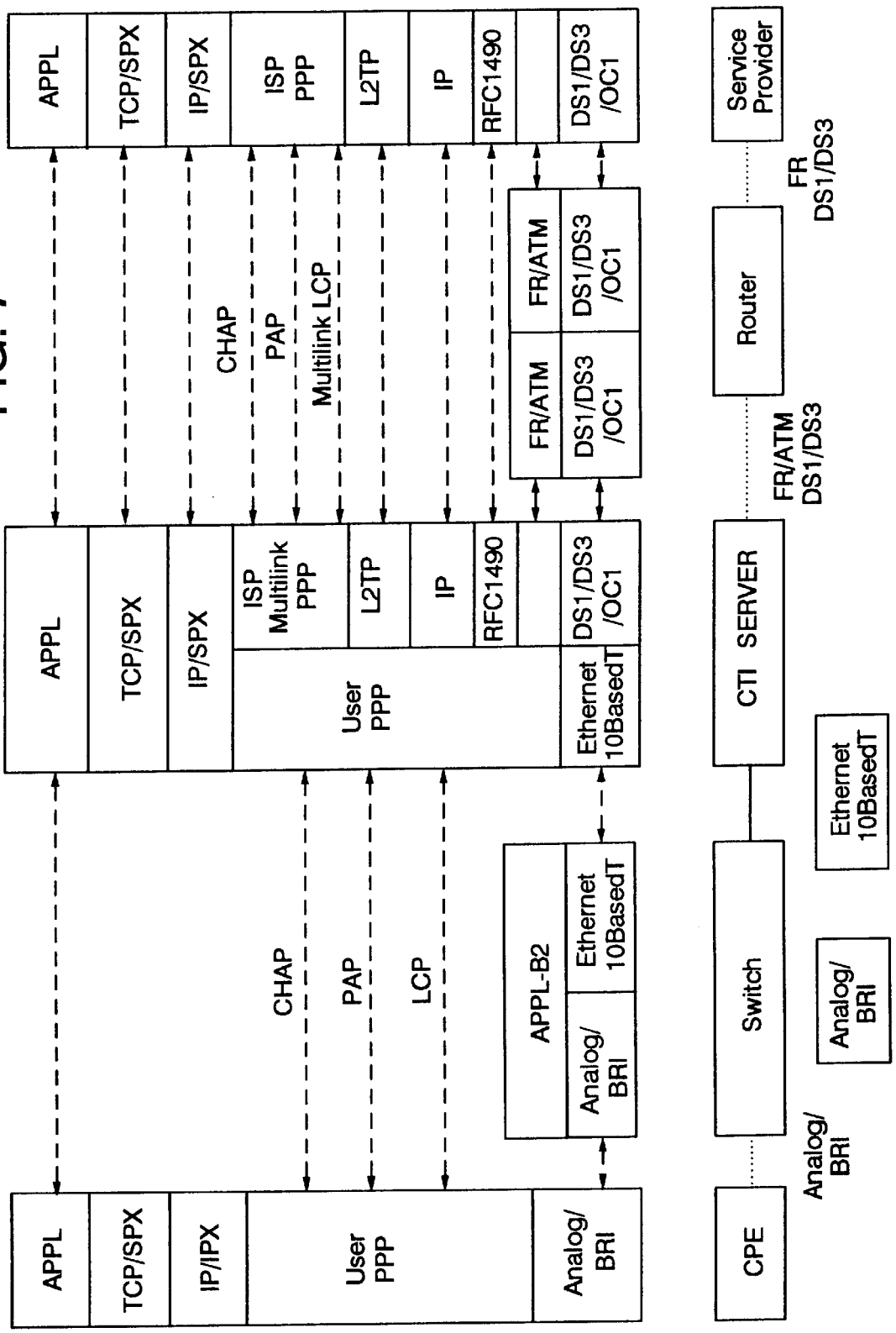
FIG. 7 shows the protocol stacks of the CTI server and how they relate to other protocol stacks in the network according to the embodiment of the present invention which is illustrated in FIG. 6.

FIG. 7 illustrates the protocol stacks and the connections between them for the network configuration shown in FIG. 6. As before, when the originating user issues a command from an application, the application passes the command down to the transport layer. The transport layer may or may not use the IP layer for its service request. The IP layer may use IP or IPX as before. Again, the user transport and IP layers will establish a PPP (point-to-point protocol) connection with the remote CTI server. The PPP connection request is passed through the analog or BRI lines to switch(es) and then to the CTI server. The CTI server hardware receives the call connection requests and sends notification messages to the applications. An application accepts the connection requests and sends a transport layer connection response and a PPP connection response. As before, the originating user and the CTI server have to exchange security information such as PAP and CHAP.

If the user wants to establish a connection to a service provider while maintaining the connection to the CTI server, the CTI server will establish the connection. The CTI server application will issue a command to the transport layer with the service provider's address. The transport and IP layers will establish a multi-link PPP connection with the remote service provider. With the network of FIG. 6, the PPP frame is encapsulated in the layer 2 tunnel protocol (L2TP) frame. The layer 3 IP converts the L2TP frames to frame relay or ATM cells based on the RFC1490 protocol. The frame relay or ATM cells are then sent through a DS-1, DS-3, or OC-1 channel to the PSTN, and then to the service provider. DS-1 refers to the North American digital signaling 1 protocol which handles speeds of up to 1.5 Mbps via a wire trunk. DS-3 refers to the digital signaling 3 protocol which handles speeds of up to 44.8 Mbps. OC-1 refers to optical carrier 1 protocol. OC-1 and OC-3 fiber optic trunks handle speeds of up to 51.8 Mbps and 155.5 Mbps respectively. All of these signaling protocols are part of well-known standards which are related to the open systems interconnect (OSI) model.

L2TP connects the Internet into a private network, tunnels layer 2 packets across a public or private network, and supports dial-out requests from an enterprise. It can be used on either an IP or a frame relay network. L2TP assigns addresses from a single pool without long distance dial-up or leased lines. L2TP also centralizes authentication and logging, using the existing IP infrastructure.

Routers may or may not be needed depending on the distance between the CTI server and service provider. The service provider hardware receives the connection requests and generates a notification to the IP layer. The IP layer provides protocol conversion from frame relay or ATM to L2TP frames based on RFC1490, a well-known standard published by the Internet Engineering Task Force (IETF). The service provider application then removes the encapsulation of the L2TP frames to PPP frames. The application accepts the connection requests and sends a transport layer connection response and a PPP connection response to the originating user. Multilink PPP and LCP are part of the PPP connection. PAP and CHAP security information exchange is also needed as part of connection establishment.

Figure 8:
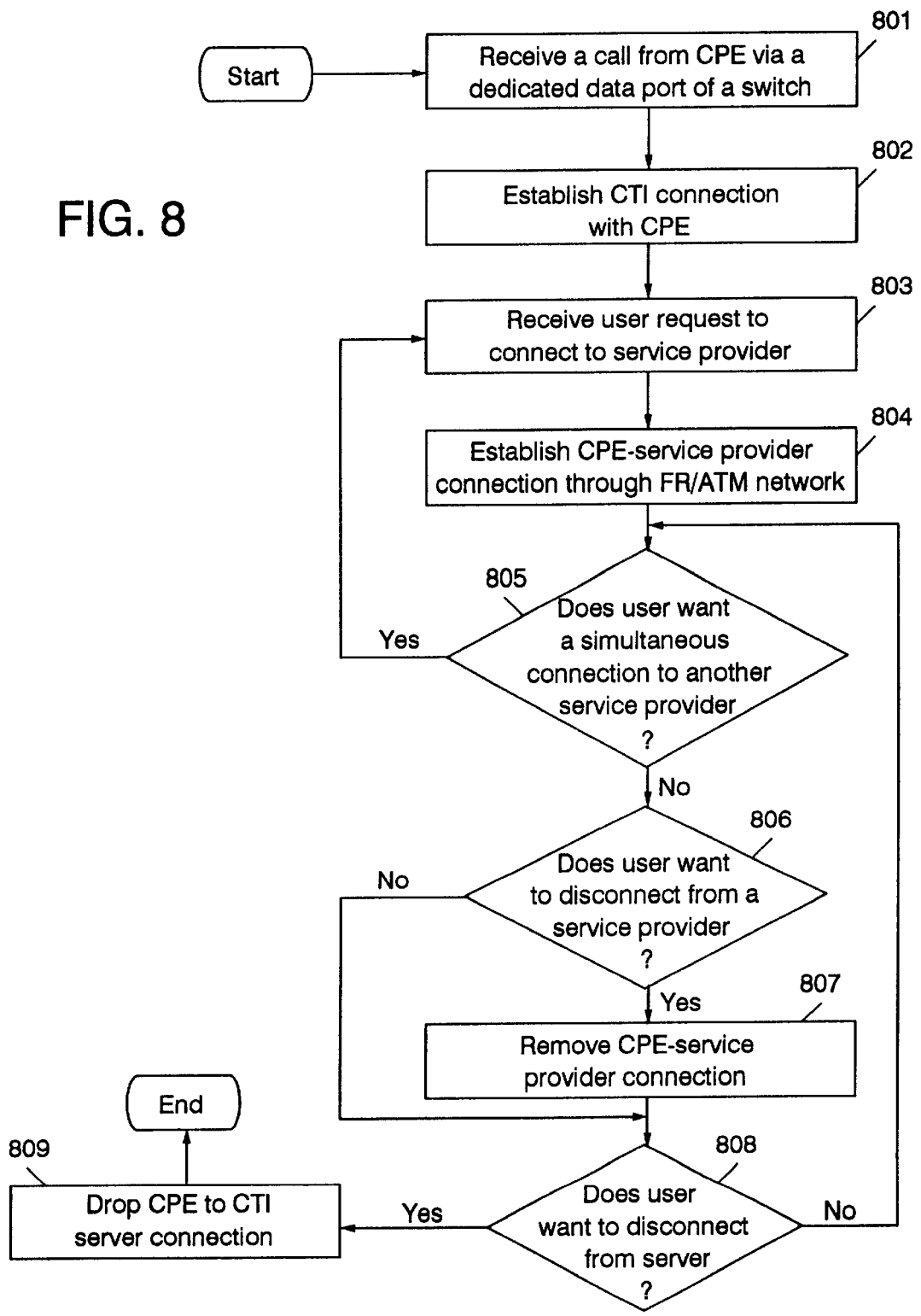
FIG. 8 shows a flow chart illustrating how connections are made through the CTI server according to the embodiment of the present invention shown in FIG. 6.

FIG. 8 illustrates the high-level method which the CTI server uses to establish and manage connections in the network environment of FIG. 6. At step 801, a call is received from the CPE through the data port on a switch. The CTI server establishes a CTI connection with the CPE at step 802. As before, the user is typically using a personal computer or workstation with point-to-point protocol (PPP) installed, and the connection is established with the CTI server using PPP. The CTI server than performs handshaking with the CPE using security protocols such as CHAP and PAP.

When the user requests a connection to a service provider at 803, the CTI server makes a connection to the service provider POP using the network address for the service provider. The connection is routed through the dedicated data network. In the preferred embodiment, this is a frame relay or ATM network. The CTI server makes the connection using PPP and L2TP, as shown in FIG. 7 and previously described. At 804 a connection is established by the CTI server performing CHAP and PAP handshaking with the service provider POP. The PPP connections with the CTI server are then terminated and a PPP connection between the CPE and the service provider POP is established transparently through the CTI server and the dedicated data network. As before, the user can request additional simultaneous connections to additional service providers at 805. The process then repeats for each simultaneous connection beginning at step 803. If multiple connections are established, the CTI server and service provider manage the connection using multilink PPP. After a connection is made, at 806, the server monitors to see if the user would like to drop a connection to a service provider at 806, and further, monitors to see if a user wishes to sever the CTI to CPE connection at 808. If the user wishes to drop a connection to an individual service provider, the server drops the connection at 807. Once the CTI server receives notification that the user wishes to log out of the CTI server or drop the CTI server to CPE connection, the CTI server drops the connection at 809 and the process ends.

Figure 9:
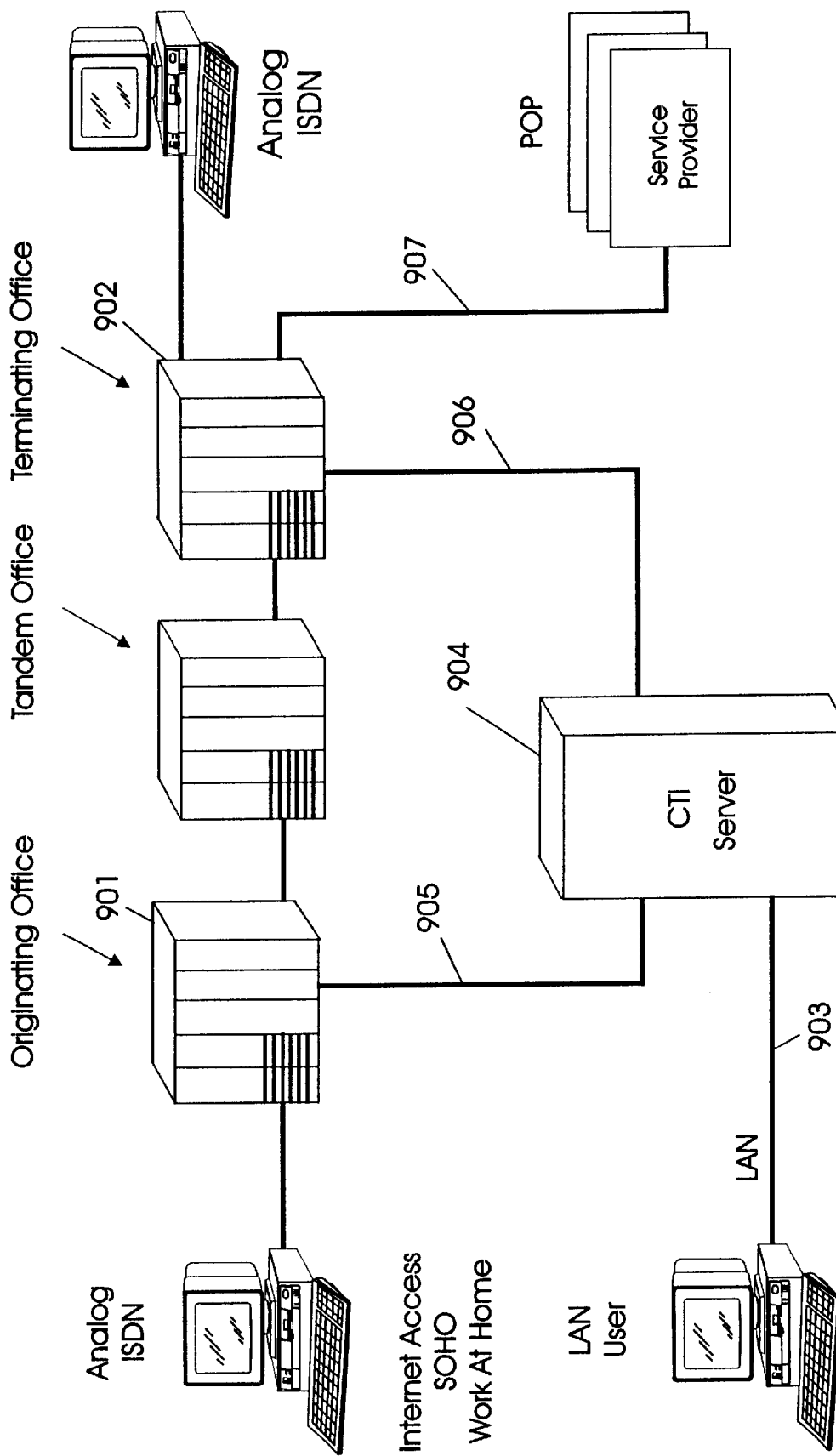
FIG. 9 is a network diagram showing a CTI server connected to users via a LAN and connected to service providers through the PSTN according to another embodiment of the present invention.

FIG. 9 shows the network environment of yet another embodiment of the present invention. According to FIG. 9, the CPE which is making use of the invention is now connected to the CTI server 904 via a local area network (LAN) 903. A data connection 905 back to an originating office 901 is present to handle CTI messaging only. The CTI server 904 of FIG. 9 is connected to a switch in a terminating office 902 via a PSTN connection 906, and the terminating office is connected to a service provider POP via a PSTN connection 907. In an analog environment these PSTN connections are T1 connections, or a subrate of T1. In an ISDN these are primary rate interface (PRI) connections, or a subrate of PRI.

A user in FIG. 9 logs onto the CTI server 904 using the CPE via LAN 903. The user then has access to CTI services. If the user requests a connection to an on-line service provider, the CTI server makes the connection using the service provider DN and the resources of the terminating office 902. If the user wishes, the CTI server can provide additional simultaneous connections to service providers using PSTN resources available at the terminating office 902.

Figure 10:
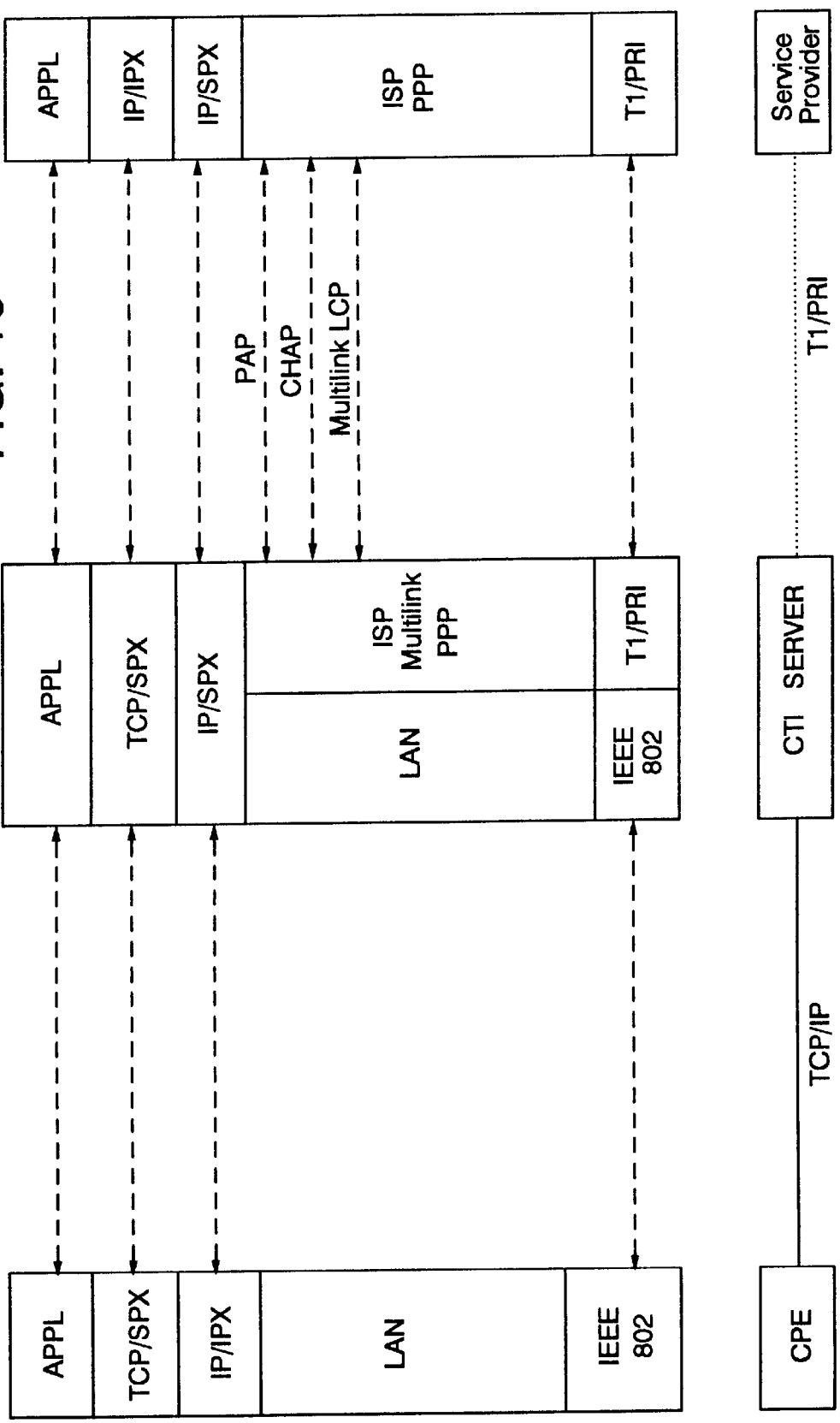
FIG. 10 shows the protocol stacks of the CTI server and how they relate to other protocol stacks in the network according to the embodiment of the present invention which is illustrated in FIG. 9.

FIG. 10 illustrates the protocol stacks and the connections between them in the network of FIG. 9. When the originating user issues a command from an application, the application passes the command down to the transport layer. As before, the transport layer in this example can be TCP or SPX. The transport layer is responsible for the end-to-end connection. The transport layer may or may not use the IP layer for its service request. As before, the IP layer can be IP or IPX. The user transport and IP layers will establish a connection with the CTI server using LAN and IEEE802 LAN based physical means.

The CTI server hardware receives the call connection requests. It sends notification to the applications. The user application accepts the connection requests and sends a transport layer and a LAN connection response to the originating user. There is typically no PAP and CHAP security exchange at this level. However, once the transport layer connection is established, the application layer may exchange security information, such as a login user id and password.

If the user wants to be connected to a service provider while maintaining the connection to the CTI server, the CTI server will establish the connection. The CTI server application will issue a command to the transport layer with the service provider's address. The transport and IP layers will establish a multilink PPP connection with the remote service provider. If a high volume of traffic is expected, a T1 or PRI connection between a CTI server and a service provider may be desired. Otherwise, a subrate connection of T1 or PRI may be sufficient. In many cases, multiple T1 or PRI connections are used.

The T1 or PRI connection is passed through switch(es) to the service provider. The service provider hardware receives the connection requests and generates a notification to the service provider application. The service provider application accepts the connection requests and sends a transport layer connection response and a PPP connection response to the originating user. Multilink and LCP are part of the PPP connection. PAP and CHAP security information exchange is also usually needed as part of this connection establishment.

Figure 11:
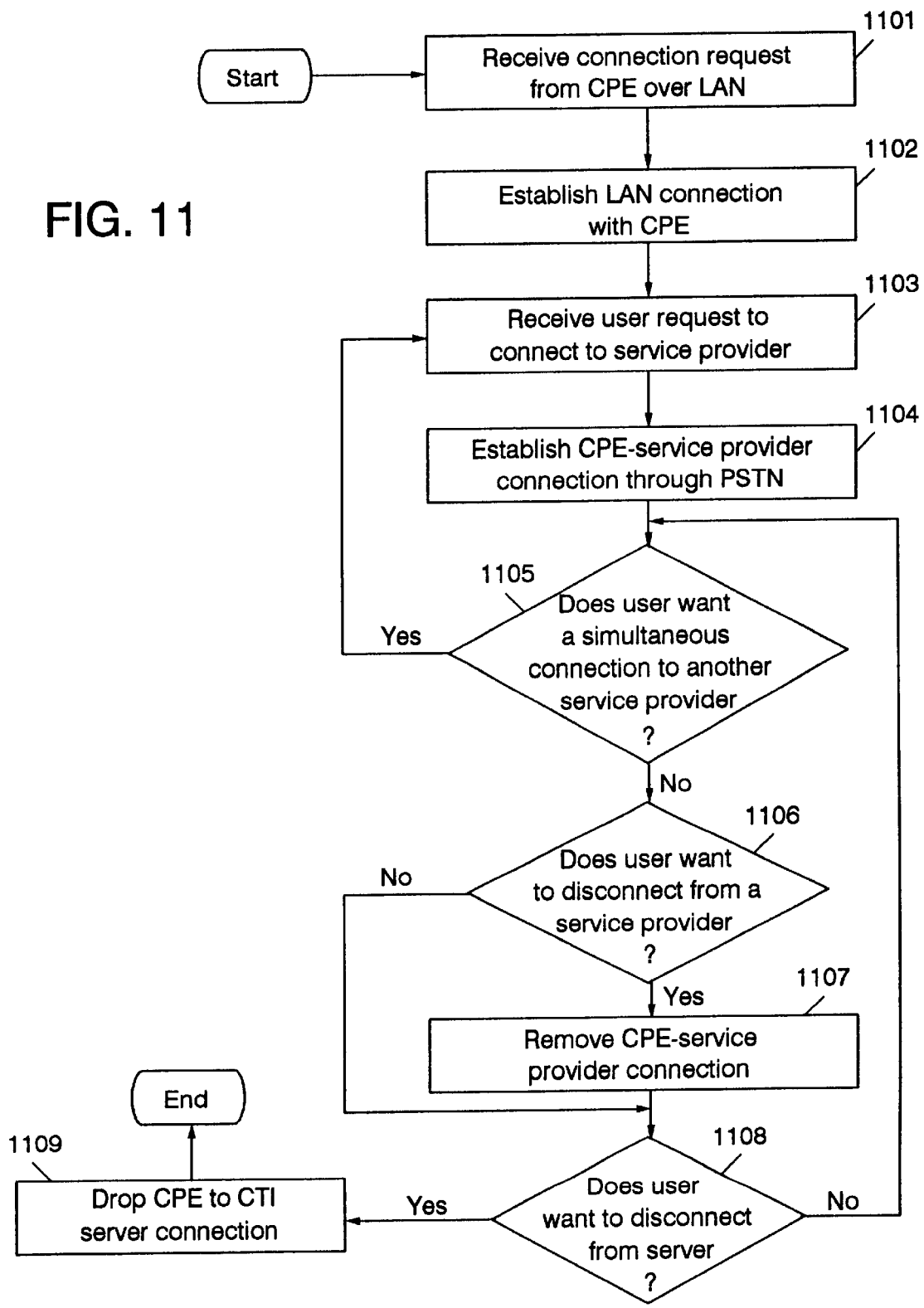
FIG. 11 shows a flow chart illustrating how a connection is made through the CTI server according to the embodiment of the present invention which is illustrated in FIG. 9.

FIG. 11 illustrates the high-level method of establishing service provider connections through the CTI server connected within the network of FIG. 9. At step 1101, the CTI server receives a connection request form the CPE over the LAN. At step 1102 a LAN connection is established between the CPE and the CTI server. At 1103, a user request to connect to a service provider is received. At 1104, the CTI server establishes a CPE to service provider connection through the PSTN.

The CTI server establishes the CPE to service provider connection by first dialing a service provider, usually an ISP, using the DN for the service provider POP. The CTI server then makes a PPP connection to the service provider POP. Once the service provider POP application is up and running, the PPP connection is terminated. The CTI server and the service provider POP then perform PAP and CHAP hand-shaking. A transparent connection then exists between the CPE on the LAN and the service provider. If the user wants an additional simultaneous connection, the CTI server receives the request at 1105, and repeats the process for the additional connection from step 1103. After all connections are made, the server monitors to see if the user would like to drop a connection to a service provider at 1106, and further, monitors to see if a user wishes to sever the CTI to CPE connection at 1108. If the user wishes to drop a connection to an individual service provider, the server drops the connection at 1107. Once the CTI server receives notification that the user wishes log out of the CTI server or drop the CTI server to CPE connection, the CTI server drops the connection at 1109 and the process ends.

Figure 12:
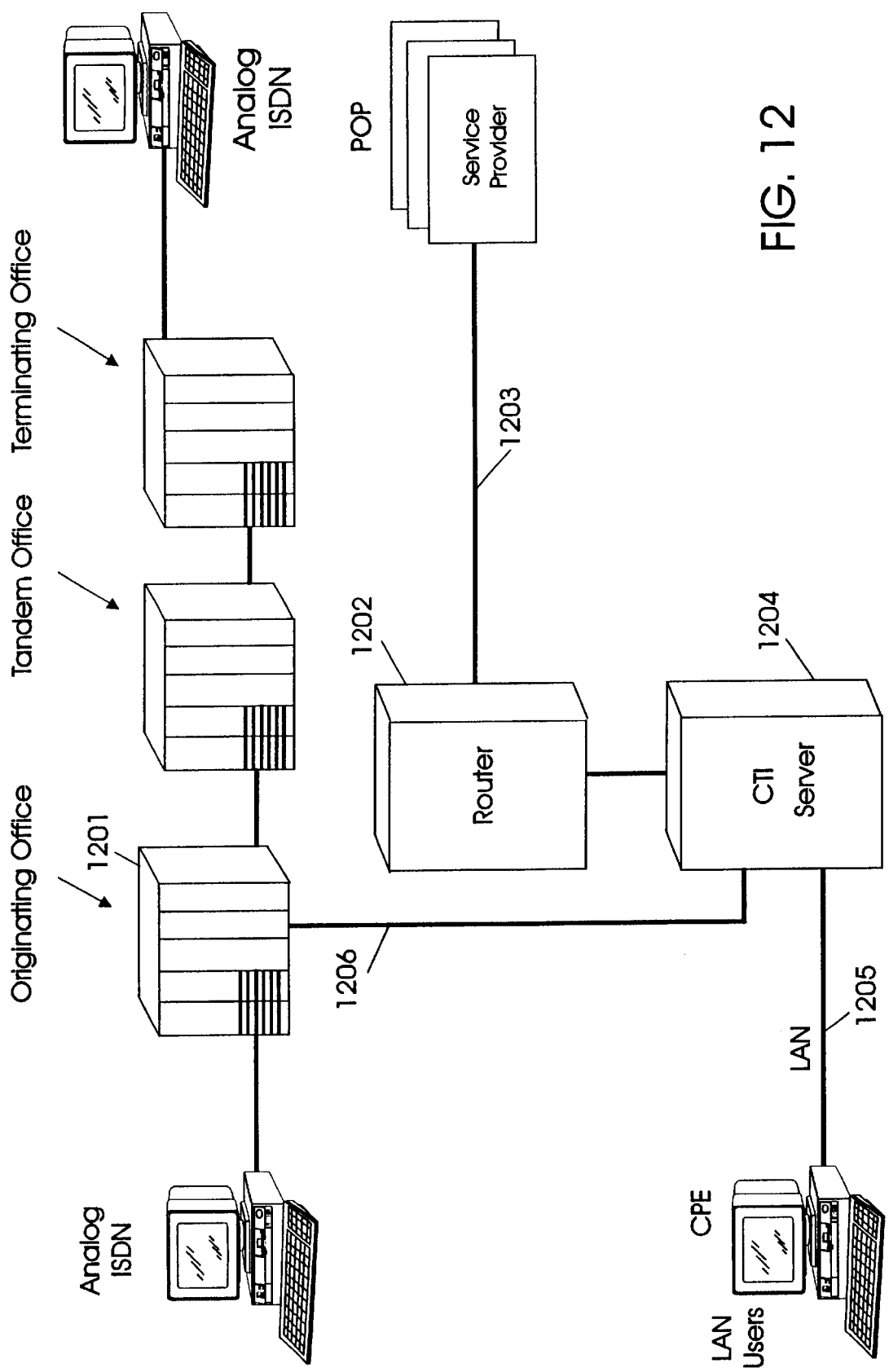
FIG. 12 is a network diagram illustrating a CTI server connected users via a LAN and to service providers via a dedicated data network which is associated with the PSTN according to another embodiment of the present invention.

FIG. 12 shows a network environment for the invention in an embodiment where the CPE making use of the invention is connected via a local area network, and the CTI server connects to a service provider POP via a dedicated data network which is associated with the PSTN. According to FIG. 12, the CPE is connected to the CTI server 1204 via LAN 1205. The CTI server has only a CTI messaging connection 1206 to the PSTN originating office 1201. The CTI server is connected to a dedicated data network 1203 which is associated with the PSTN. Router 1202 represents the entry point for this dedicated data network. In practice, any networking device can be the entry point for the dedicated data network, including a packet switch or ATM switch. This network normally provides for the off-loading of data calls from the PSTN to save PSTN switching resources. The dedicated data network, like the PSTN, has multiple paths and entry points to access multiple service providers. The users in FIG. 12 log into the CTI server through the LAN 1205. If a user requests access to an on-line service provider, the CTI connects them through the dedicated data network.

Figure 13:
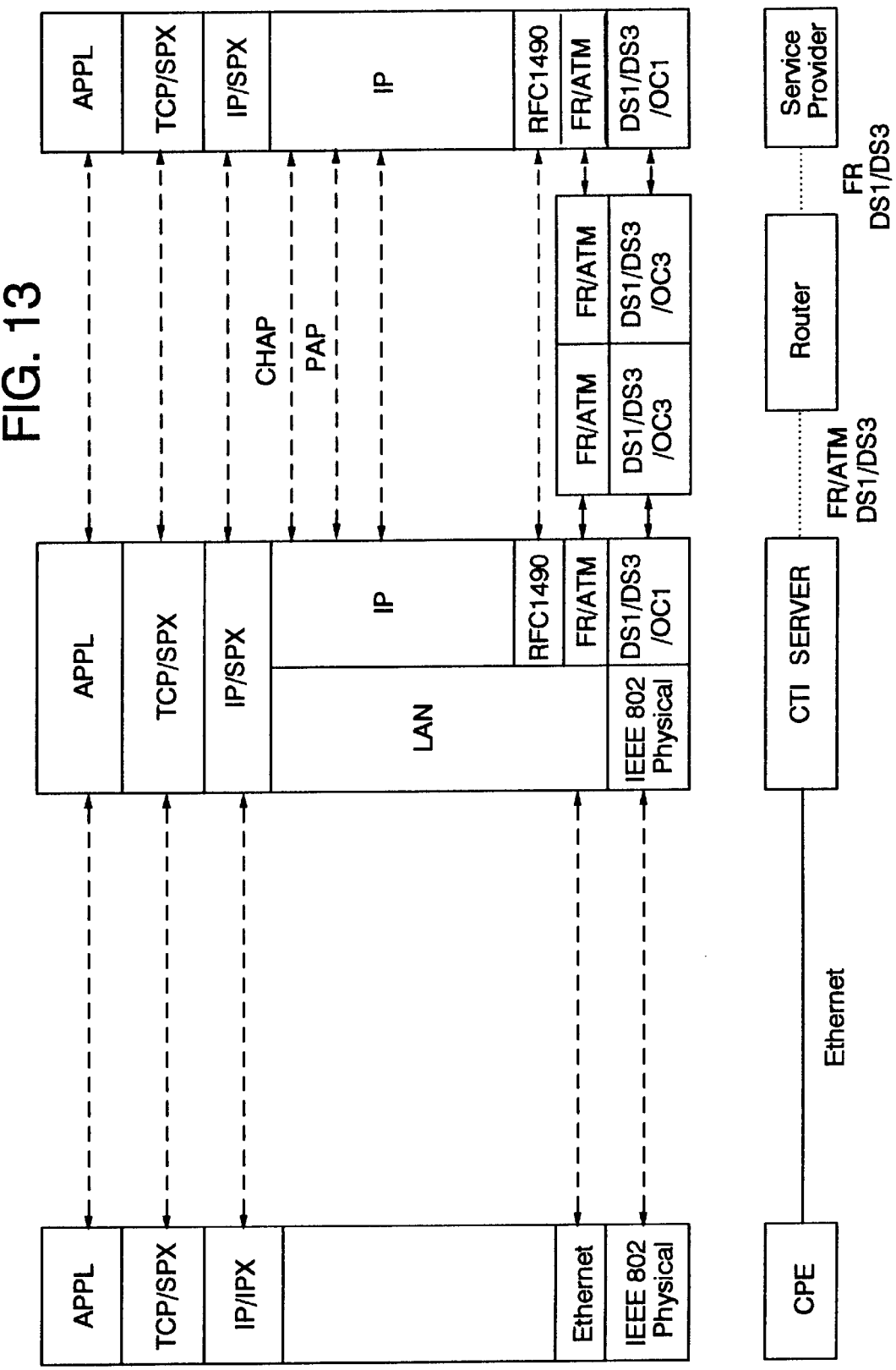
FIG. 13 shows the protocol stacks of the CTI server and how they relate to other protocol stacks in the network according to the embodiment of the present invention which is illustrated in FIG. 12.

FIG. 13 shows the protocol stacks and the connections between them in the network of FIG. 12. When the originating user issues a command from an application, the application passes the command down to the transport layer which can be TCP or SPX. The transport layer is responsible for the end-to-end connection. The transport layer may or may not use the IP layer for its service request. The IP layer can be IP or IPX. The user transport and IP layers will establish a connection with the CTI server using LAN and IEEE802 LAN based physical means. The CTI server hardware receives the call connection requests. It sends notification to the applications. The user application accepts the connection requests and sends a transport layer and a LAN connection response to the originating user. There is typically no PAP and CHAP security exchange at this level. However, once the transport layer connection is established, the application layer may exchange security information, such as login user id and password.

If the user wants to establish a connection to a service provider while maintaining the connection to the CTI server, the CTI server will establish the connection. The CTI server application will issue a command to the transport layer with the service provider's address. The transport and IP layers will establish a multi-link PPP connection with the remote service provider. The PPP frame is encapsulated in the L2TP (layer 2 tunnel protocol) frame. The layer 3 IP converts the L2TP frames to frame relay or ATM cells based on RFC1490 protocol, which is well-known in the art. The frame relay or ATM cells are then sent through the DS1, DS3, or OC1 channels to the PSTN, and then to the service provider.

Routers may or may not be needed to make the connection to the service provider, depending on the distance between the CTI server and service provider. The service provider hardware receives the connection requests and generates a notification to the IP layer. The IP layer provides protocol conversion from frame relay or ATM to L2TP frames based on RFC1490. The service provider application then removes the encapsulation of the L2TP frames to PPP frames. The service provider application accepts the connection requests and sends a transport layer connection response and a PPP connection response to the originating user. Multilink and LCP are part of the PPP connection. PAP and CHAP security information exchange, or some other form of security exchange, is also needed as part of this connection establishment.

Figure 14:
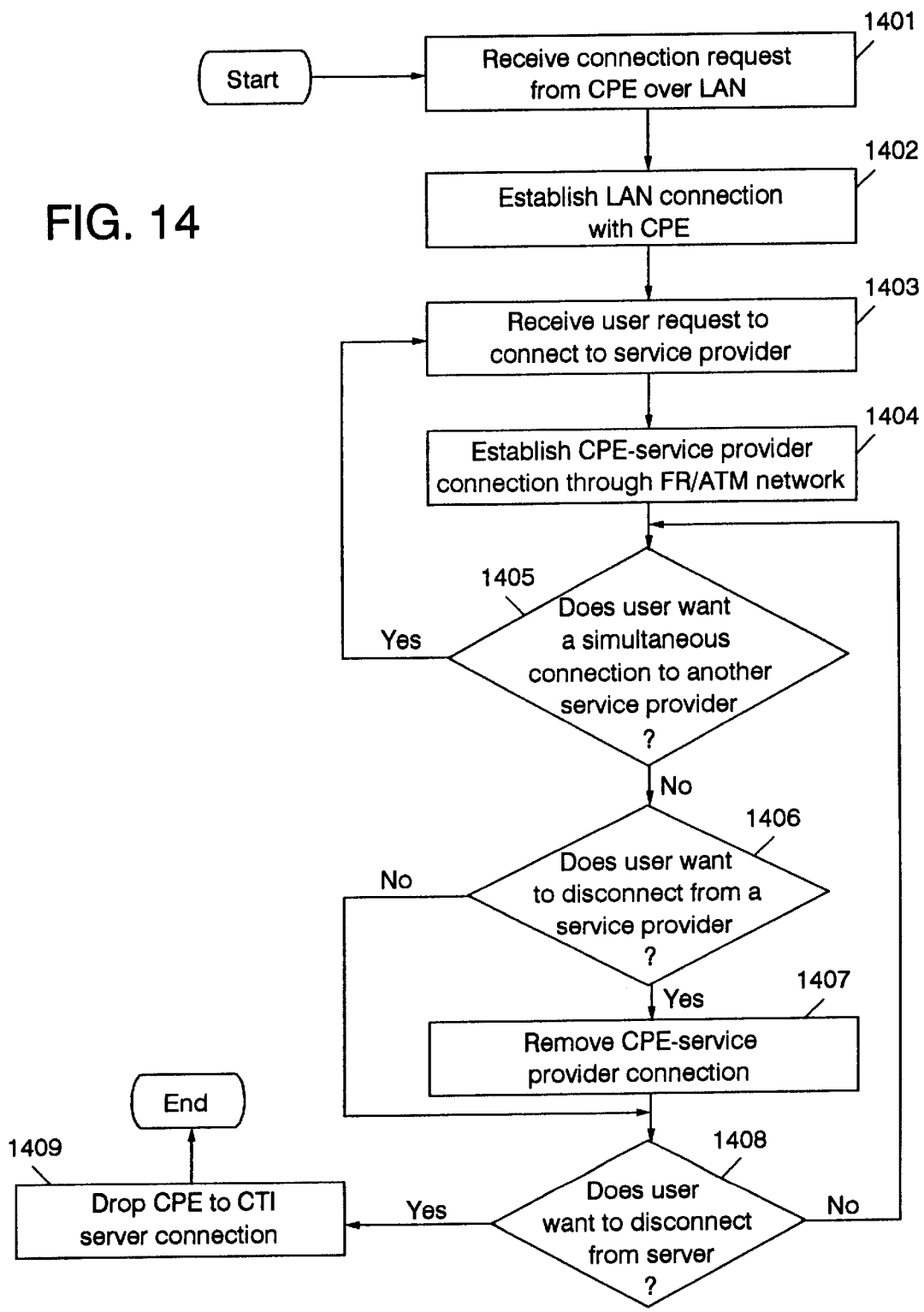
FIG. 14 shows a flow chart illustrating how a connection is made through the CTI server according to the embodiment of the present invention which is illustrated in FIG. 12.

FIG. 14 shows the high-level method of establishing a connection between the CPE and a service provider POP in the network environment of FIG. 12. A LAN connection between the CPE and the CTI server is first established at 1401. This process normally includes some type of log in procedure. At 1402, the CTI server receives a request from a user to access a service provider. At 1403, the CTI server establishes a connection between the CPE and the service provider.

In order for the CTI server to establish a CPE to service provider connection, it uses the service provider POP network address to route a call to the service provider POP. The call is then routed through the network until a connection is established. An intermediate PPP connection is not needed in this case, since a PSTN switch is not being used at either end of the connection. However, the dedicated data network which is associated with the PSTN and which is part of the public network is still used. Since this dedicated data network has many connections and paths, multiple simultaneous connections to multiple service providers can be established by the CTI server. If the user requests additional simultaneous connections to additional service providers as determined in step 1404 of FIG. 14, the process repeats from step 1402, so additional simultaneous connections are established. After the connections are made, the server monitors to see if the user would like to drop a connection to a service provider at 1406, and further, monitors to see if a user wishes to sever the CTI to CPE connection at 1408. If the user wishes to drop a connection to an individual service provider, the server drops the connection at 1407. Once the CTI server receives notification that the user wishes log out of the CTI server or drop the CTI server to CPE connection, the CTI server drops the connection at 1409 and the process ends.

Figure 15:
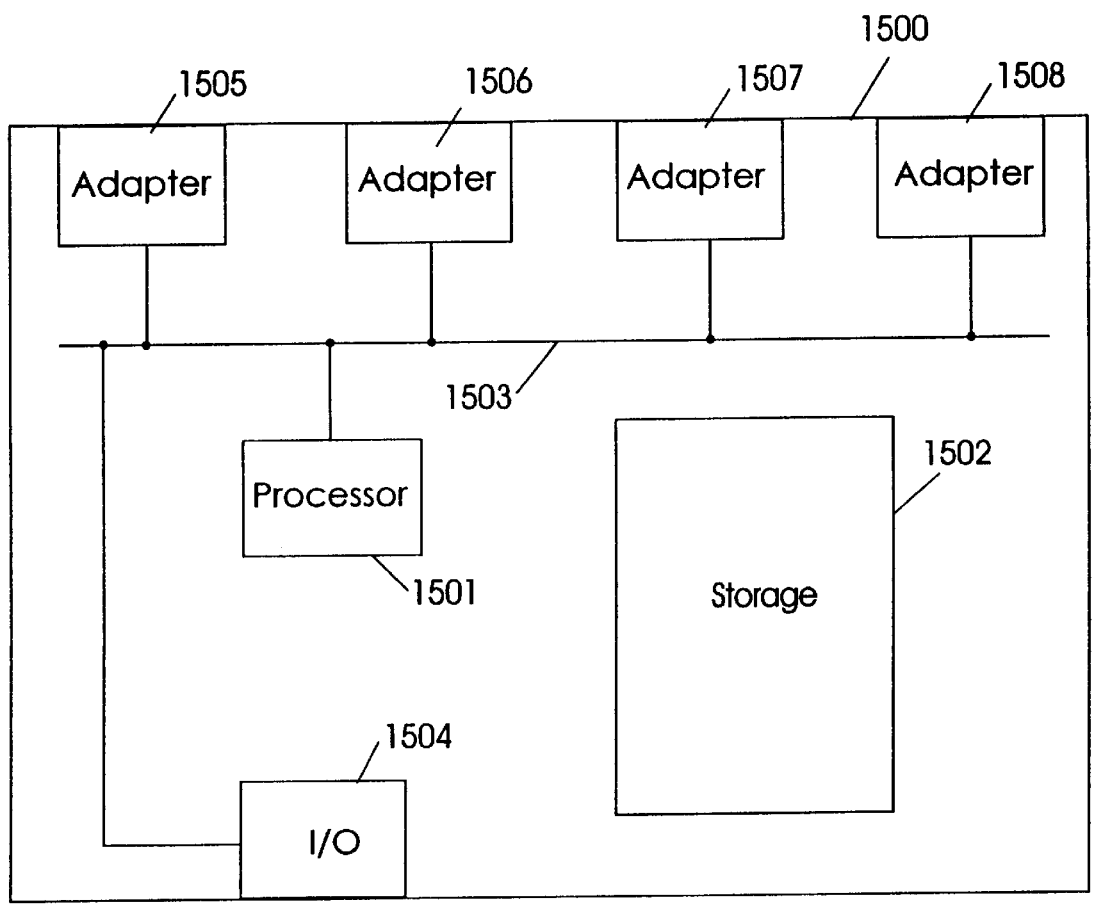
FIG. 15 shows a functional block diagram of a CTI server according to the present invention.

FIG. 15 shows a block diagram of a computer telephony integration (CTI) server 1500 according to the present invention. The CTI server includes adapter 1505 which is the data link adapter for a CTI services and is not related to the present invention. Adapters 1506 through 1508 are voice processing adapters for connection to the PSTN, or LAN adapters or adapters to connect to a service provider through a dedicated data network, depending on which embodiments of the invention are being employed. They need not all be present, depending on which embodiment of the invention is being employed. Optionally, input/output (I/O) device 1504 allows computer program code to be loaded into the system. This device can be a CD-ROM or floppy disk drive, or some other type of media device such as a tape drive. Software can also be loaded into the system by downloading from the Internet or some other type of network. Processor 1501 and storage 1502 together with appropriate computer program code form the processing core for controlling the operation of the CTI server, including establishing and managing calls and providing CTI services. The computer program code can be initially loaded or updated using the I/O device 1504 and then updated via a network connection. The storage 1502 can be random access memory (RAM) and/or some sort of permanent programmed memory device in which the computer program code which implements parts of the invention resides. All of the above-mentioned devices connect to and communicate over bus 1503. With some architectures, there can actually be two buses, one for voice processor adapters and one for data adapters. Only one bus is shown in this case for simplicity. In practice, the CTI server is often implemented by a workstation or personal computer, which provides all the necessary functions.

Figure 16:
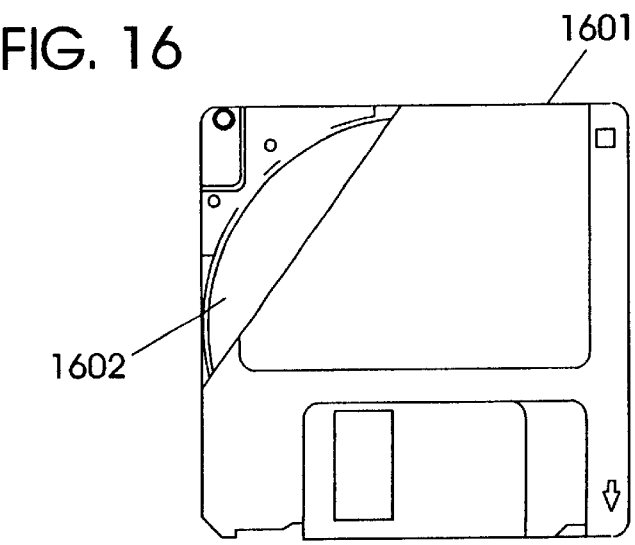
FIG. 16 shows one example of a media that can be used to store computer program code which implements the present invention.

As previously stated, appropriate computer program code in combination with hardware implements some elements of the present invention. This computer program code is at some stage stored on a storage media. This media can be a diskette, hard disk or CD-ROM or tape. The media can also be a memory storage device or collection of memory storage devices such as read-only memory (ROM) or random-access memory (RAM). Additionally, the computer code can be transferred to the workstation over the Internet or some other type of network. FIG. 16 illustrates one example of a media. FIG. 16 shows a diskette of the type where a magnetic media 1602 is enclosed in a protective jacket 1601. Magnetic field changes over the surface of the magnetic media 1602 are used to encode the computer program code. In this way the computer program code is stored for later retrieval.

We have described specific embodiments of our invention which provides an enhanced CTI server which is more closely integrated with the public switched telephone network in order to provide dial-up access and the ability to access multiple service providers. It is possible to combine the various embodiments to provide a CTI server connected to the network and to users in various ways. One of ordinary skill in the networking art will quickly recognize that the invention has other applications in other environments. In fact, many embodiments and implementations are possible.

We claim:

1. In a computer telephony integration (CTI) server, a method of providing access to on-line services, the method comprising the steps of:

receiving a dial-up call at the CTI server from customer premises equipment (CPE) through a public switched telephone network (PSTN), wherein the CPE uses the CTI server directory number (DN);

establishing a CTI connection between the CTI server and the CPE;

receiving a request from a user of the CPE to connect to a service provider; and establishing a CPE to service provider connection through the PSTN.

2. The method of claim 1 further comprising the steps of:

receiving an additional request to connect to an additional service provider; and establishing an additional, simultaneous CPE to service provider connection through the PSTN.

3. In a computer telephony integration (CTI) server, a method of providing access to on-line services, the method comprising the steps of:
   receiving a connect request at the CTI server from customer premises equipment (CPE) over a local area network (LAN);
   establishing a CTI connection between the CTI server and customer premises equipment over the (LAN);
   receiving a request from a user of the CPE to connect to a service provider; and
   establishing a CPE to service provider connection through a public switched telephone network (PSTN), using a service provider directory number (DN).

4. The method of claim 3, further comprising the steps of:
   receiving an additional request to connect to an additional service provider; and
   establishing an additional, simultaneous CPE to service provider connection through the PSTN, using an additional service provider DN.

5. In a computer telephony integration (CTI) server, a method of providing access to on-line services, the method comprising the steps of:
   receiving a connection request at the CTI server from customer premises equipment (CPE) over a local area network (LAN);
   establishing a CTI connection between the CTI server and customer premises equipment over the (LAN);
   receiving a request from a user of the CPE to connect to a service provider; and
   establishing a CPE to service provider connection through a dedicated data network which is associated with a public switched telephone network (PSTN).

6. The method according to claim 5 further comprising the steps of:
   receiving an additional request to connect to an additional service provider; and
   establishing an additional, simultaneous CPE to service provider connection through the dedicated data network which is associated with the PSTN.

7. In a computer telephony integration (CTI) server, a method of providing access to on-line services, the method comprising steps of:
   receiving a dial-up call at the CTI server from customer premises equipment (CPE) through a public switched telephone network (PSTN);
   establishing a CTI connection between the CTI server and the CPE;
   receiving a request from a user of the CPE to connect to a service provider; and
   establishing a CPE to service provider connection through a dedicated data network which is associated with the PSTN.

8. The method according claim 7 further comprising the steps of:
   receiving an additional request to connect to an additional service provider; and
   establishing an additional, simultaneous CPE to service provider connection through the dedicated data network which is associated with the PSTN.

9. The method according to any of claims 1–8 further comprising the steps of:
   receiving a request to disconnect from a service provider;
   removing a CPE to service provider connection;
   receiving a request to disconnect from the CTI server; and
   dropping the CTI connection between the CTI server and the CPE.

10. A computer program product for use with a computer telephony integration (CTI) server, for further providing on-line access using public network resources, the computer program product having a medium with computer program code embodied therein, the computer program code comprising:
    computer program code for receiving a dial-up call at the CTI server from customer premises equipment (CPE) through a public switched telephone network (PSTN), the CPE using the CTI server directory number (DN);
    computer program code for establishing a CTI connection between the CTI server and the CPE;
    computer program code for receiving a request from a user of the CPE to connect to a service provider; and
    computer program code for establishing a CPE to service provider connection through the PSTN.

11. The computer program product of claim 10 wherein the computer program code further comprises:
    computer program code for receiving an additional request to connect to an additional service provider; and
    computer program code for establishing an additional, simultaneous CPE to service provider connection through the PSTN.

12. A computer program product for use with a computer telephony integration (CTI) server, for further providing on-line access using public network resources, the computer program product having a medium with computer program code embodied therein, the computer program code comprising:
    computer program code for receiving a connect request at the CTI server from customer premises equipment (CPE) over a local area network (LAN);
    computer program code for establishing a CTI connection between the CTI server and customer premises equipment over the (LAN);
    computer program code for receiving a request from a user of the CPE to connect to a service provider; and
    computer program code for establishing a CPE to service provider connection through the PSTN using a service provider directory number (DN). CPE to service provider connection through the PSTN.

13. The computer program product of claim 12 wherein the computer program code further comprises:
    computer program code for receiving an additional request to connect to an additional service provider; and
    computer program code for establishing an additional, simultaneous CPE to service provider connection through the PSTN, using an additional service provider DN.

14. A computer program product for use with a computer telephony integration (CTI) server, for further providing on-line access using public network resources, the computer program product having a medium with computer program code embodied therein, the computer program code comprising:
    computer program code for receiving a connection request at the CTI server from customer premises equipment (CPE) over a local area network (LAN);
    computer program code for establishing a CTI connection between the CTI server and customer premises equipment over the (LAN);

computer program code for receiving a request from a user of the CPE to connect to a service provider; and computer program code for establishing a CPE to service provider connection through a dedicated data network which is associated with a public switched telephone network (PSTN).

15. The computer program product of claim 14 wherein the computer program code further comprises:

computer program code for receiving an additional request to connect to an additional service provider; and computer program code for establishing an additional, simultaneous CPE to service provider connection through the dedicated data network which is associated with the PSTN.

16. A computer program product for use with a computer telephony integration (CTI) server, for further providing on-line access using public network resources, the computer program product having a medium with computer program code embodied therein, the computer program code comprising:

computer program code for receiving a dial-up call at the CTI server from customer premises equipment (CPE) through a public switched telephone network (PSTN);

computer program code for establishing a CTI connection between the CTI server and the CPE;

computer program code for receiving a request from a user of the CPE to connect to a service provider; and computer program code for establishing a CPE to service provider connection through a dedicated data network which is associated with the PSTN.

17. The computer program product of claim 16 wherein the computer program code further comprises:

computer program code for receiving an additional request to connect to an additional service provider; and computer program code for establishing an additional, simultaneous CPE to service provider connection through the dedicated data network which is associated with the PSTN.

18. The computer program product according to any of claims 10–17 wherein the computer program code further comprises:

computer program code for receiving a request to disconnect from a service provider;

computer program code for removing a CPE to service provider connection;

computer program code for receiving a request to disconnect from the CTI server; and computer program code for dropping the CTI connection between the CTI server and the CPE.

* * * * *